Nov. 14, 1939.  A. E. ZOPPA  2,179,537
SELF-ENERGIZING SEA WATER PROCESSING PLANT
Filed April 11, 1938  4 Sheets-Sheet 1

INVENTOR
Arthur E Zoppa
BY
ATTORNEY

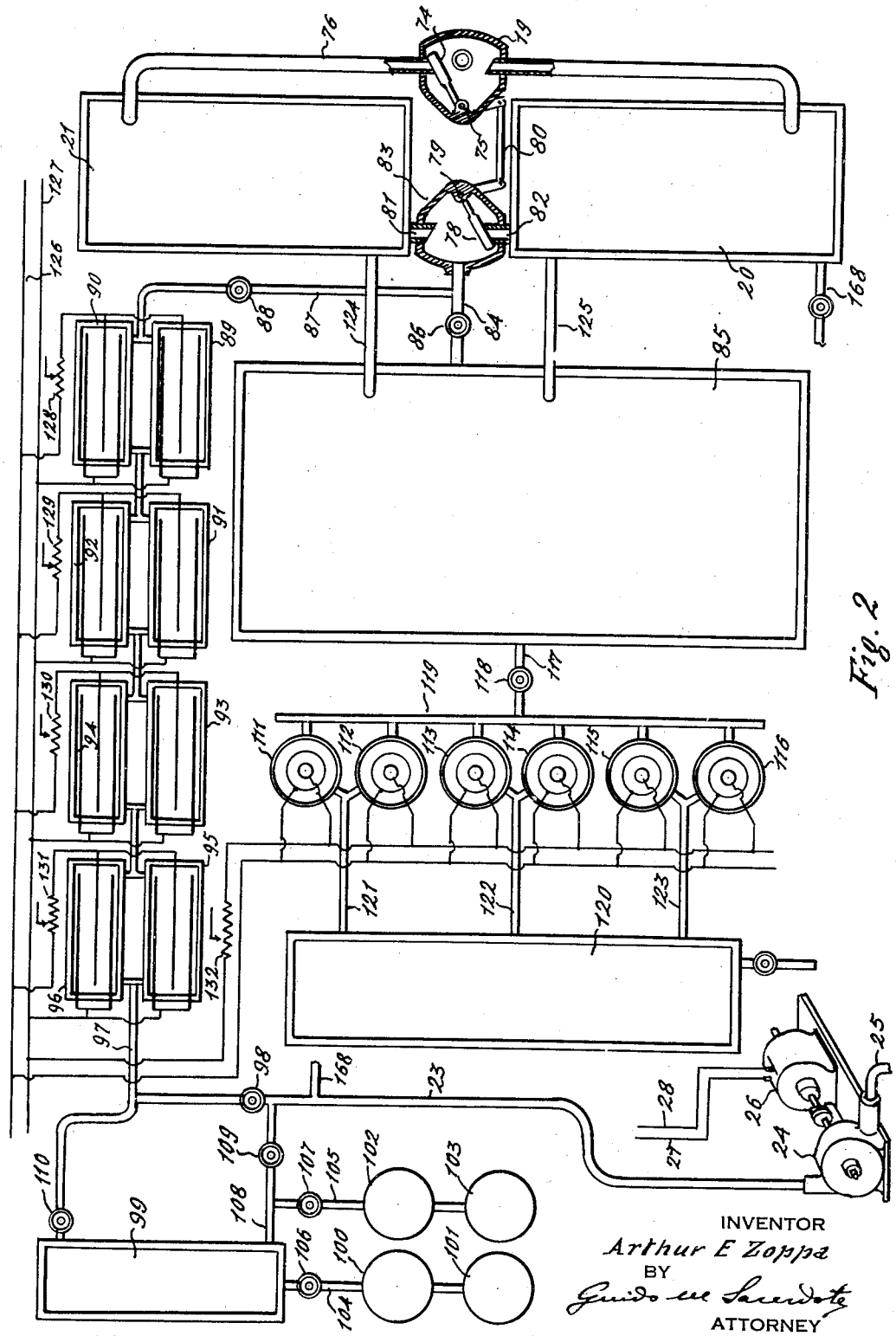

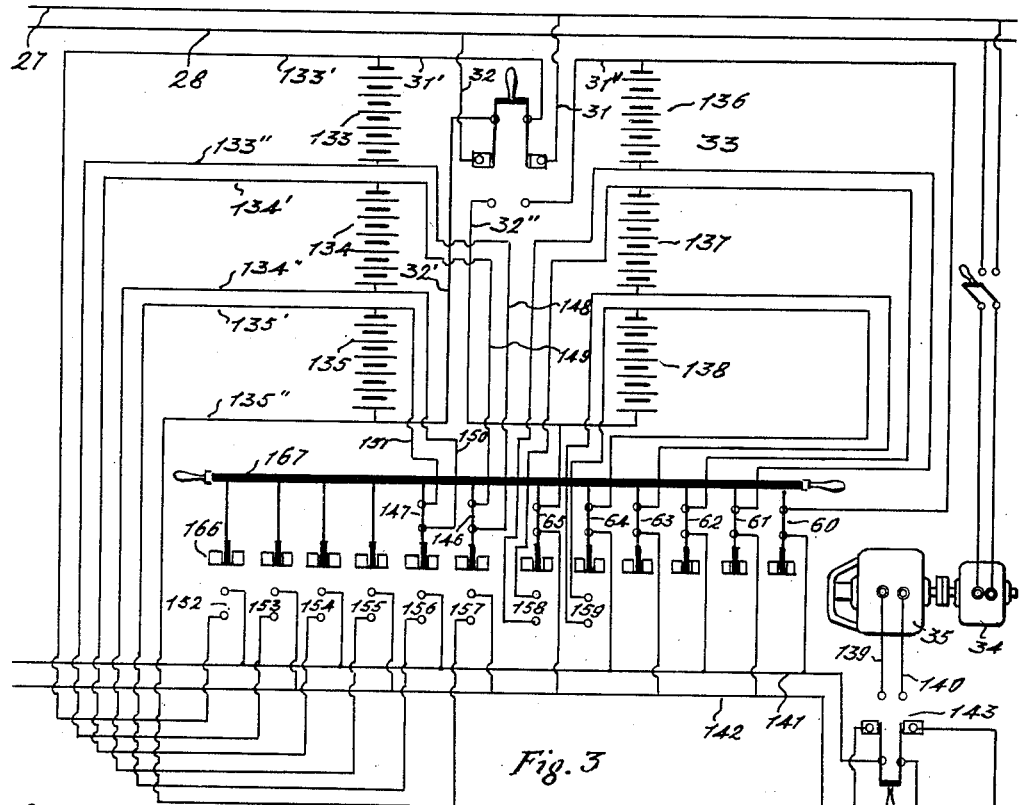

Nov. 14, 1939. A. E. ZOPPA 2,179,537
SELF-ENERGIZING SEA WATER PROCESSING PLANT
Filed April 11, 1938 4 Sheets-Sheet 4
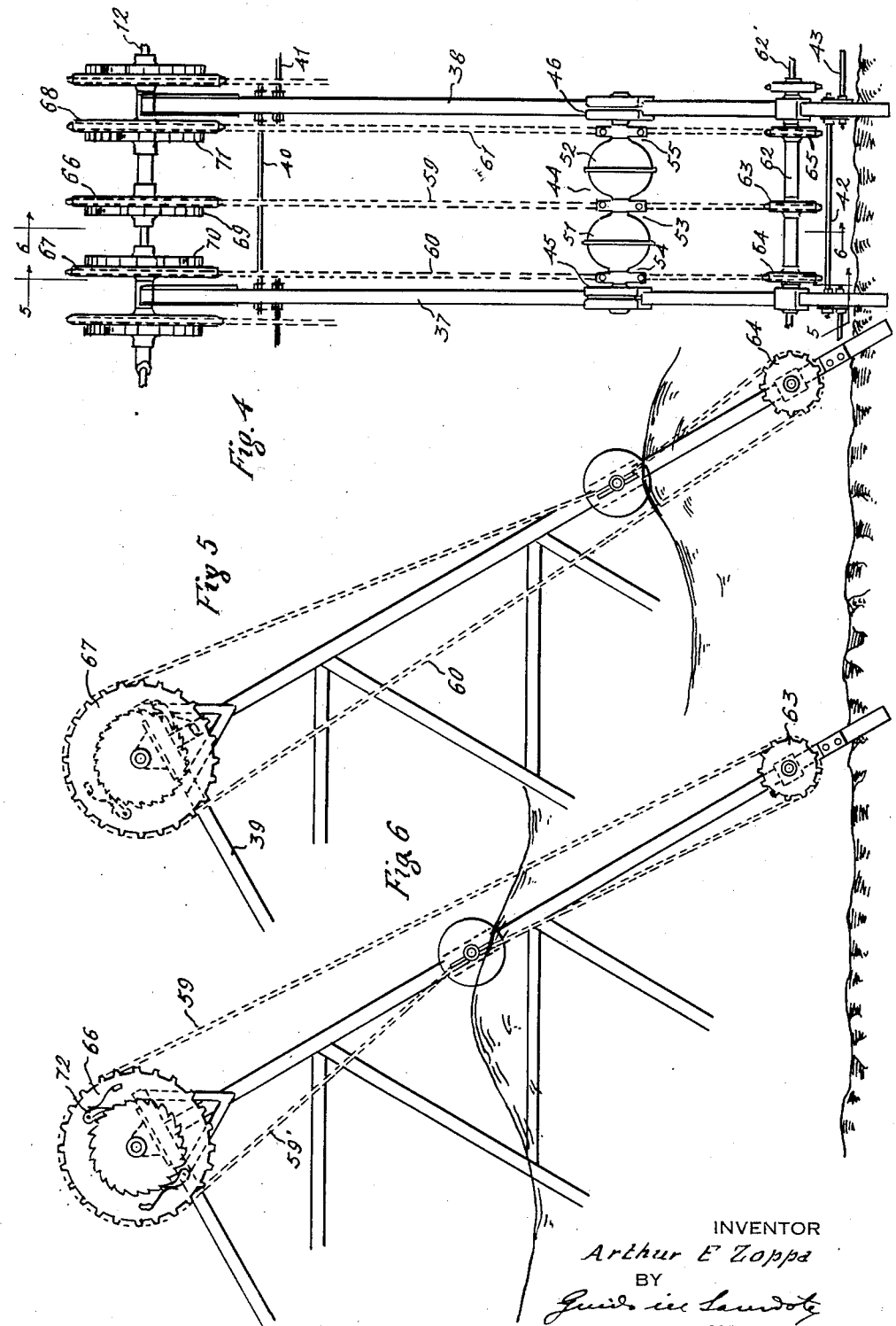
INVENTOR
Arthur E Zoppa
BY
ATTORNEY Patented Nov. 14, 1939

2,179,537

UNITED STATES PATENT OFFICE 2,179,537

SELF-ENERGIZING SEA WATER PROCESSING PLANT

Arthur E. Zoppa, New York, N. Y.

Application April 11, 1938, Serial No. 201,405

9 Claims. (Cl. 290—42)

This invention relates to methods of and means for recovering valuable materials from sea water and more particularly refers to improvements in plants for the recovery of metals and chemicals contained in sea water, requiring the expenditure of electrical energy.

It is well known that, besides containing a sizable proportion of sodium chloride and magnesium chloride, sea water also contains minute percentages of other substances, some of which are vitally important to modern civilization.

Some of these substances, like bromine, for instance, can be extracted by subjecting sea water to a purely chemical treatment, while other substances, like gold, chlorine, sodium hydroxide, etc., require an electrolytic treatment.

Even where a purely chemical treatment is required, reactions are generally assisted by the application of heat, and therefore some source of energy must be available for the generation of this heat. Furthermore, the mere fact that the water is to be subjected to some treatment other than or besides evaporation, means that water must be handled in large volumes and, therefore, a proportionately large expenditure of energy will be required from a purely mechanical standpoint.

When only evaporating processes are required, such as are employed, for instance, in the production of common salt to be subsequently refined, it is sufficient to have extensive basins or reservoirs practically at sea level in direct communication with the sea, so that no energy is required for filling them with sea water and allowing the salts to collect by crystallization.

On the other hand, some of the valuable substances contained in sea water are to be found in such minute percentages that the expenditure of energy required for handling and processing the water has so far defeated most efforts directed towards their recovery, on account of the cost factors involved.

These cost factors include not only investment charges, interest and depreciation, but also operating costs largely due to the generation of the necessary power. For instance, bromine has been successfully extracted in commercial quantities from sea water by pumping water from the sea, extracting the bromine by chemical action and discharging the processed water back into the sea; but it is obvious that if the cost of operating the pumps could be materially reduced or entirely avoided, commercial operations of this type could be rendered much more profitable, in fact, practical enough to warrant the recovery of other substances which cannot be economically obtained under present conditions.

Some of these substances are of a metallic nature and some non-metallic and will, of course require different treatments for their recovery.

The primary object of this invention is to provide a practical method of processing sea water, whereby the electrical energy required in the form of electric current or heat by the processing operations is generated by the direct utilization of the energy produced by the waves, so that the most important factor of cost will be eliminated practically in its entirety.

Another object is to provide a novel and improved arrangement of sea water processing plant, making it possible to conduct all processing operation in a continuous and complete cycle in which the power necessary to bring the water to the place of treatment and the electric power and heat required by the processing operations are supplied by the wave energy of the water itself.

A further object is to provide a novel and improved type of apparatus for utilizing the energy of the waves for delivering water from the sea to a place where it can be subjected to chemical or electrochemical treatments, or both, said place being at a relatively high level, making it possible to further utilize the head of water for generating the electrical energy required by the processing operations.

Other objects and advantages of the present invention will more fully appear as the description proceeds and will be set forth and claimed in the appended claims.

My invention is illustrated by way of example in the accompanying drawings, in which:

Fig. 2 is a plan view of a typical recovery installation forming part of the same processing plant;

Fig. 3 is a diagrammatic illustration of a low voltage electric installation, adapted to serve the apparatus shown in Fig. 2;

Fig. 4 is a front view in elevation of part of the apparatus for transforming wave energy into utilizable power, shown in Fig. 1;

Fig. 5 is a section view in elevation thereof through line 5—5 of Fig. 4;

Fig. 6 is a similar view through line 6—6 of Fig. 4; and

Fig. 7 is a detail front view in elevation showing in an enlarged scale the construction and mounting of the floats used in the power generating apparatus shown in the preceding figures.

Figure 1:
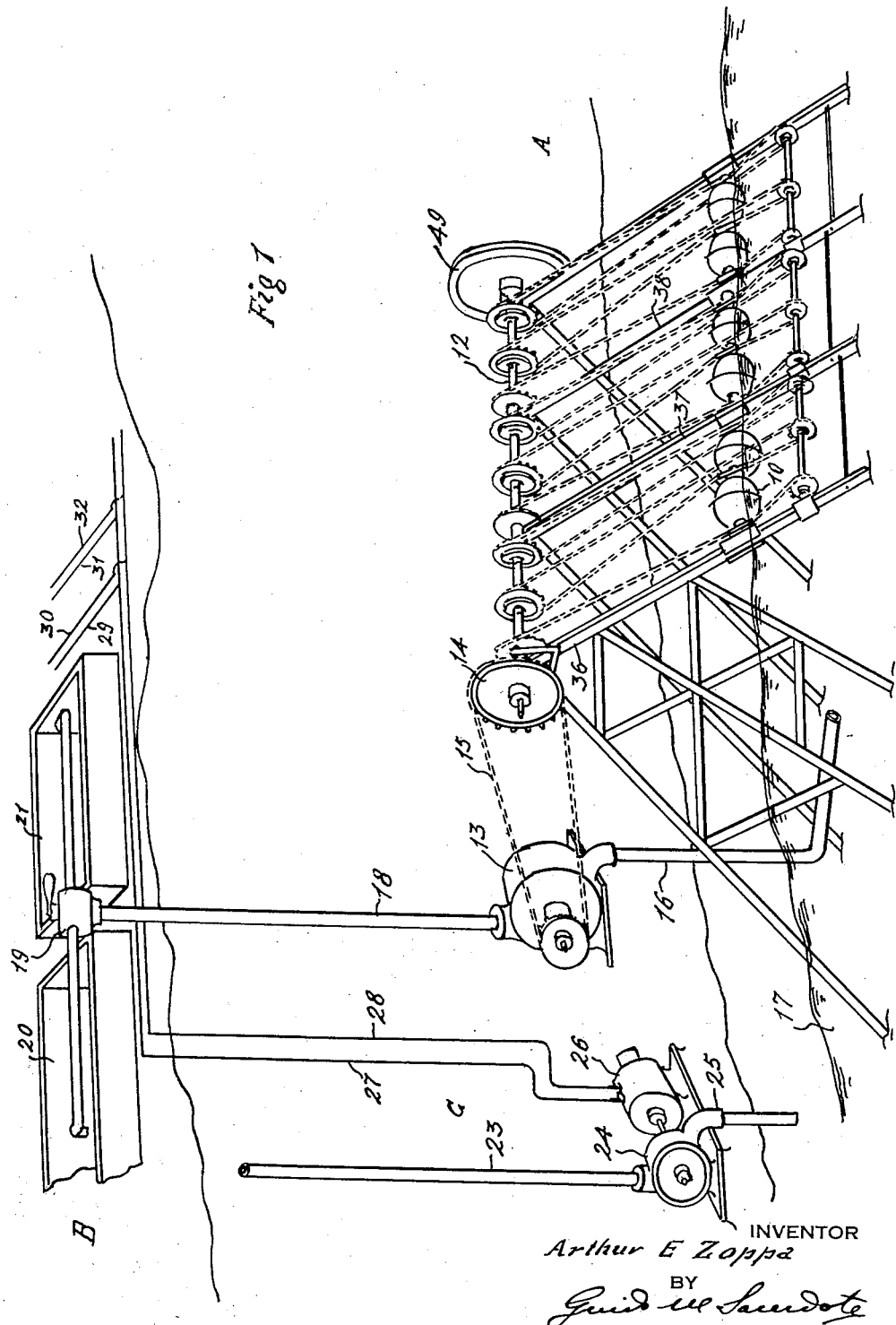
Fig. 1 is a somewhat diagrammatic perspective view of the power generating and water delivering part of a processing plant embodying my invention.

It is well known that sea water contains in solution at least thirty-two out of the eighty known elements, among these being chlorine, bromine, sulphur, potassium, sodium, calcium, magnesium, and minute quantities of other substances. Most of these elements are in the form of salts, which after extraction must be subjected to further treatment in order to recover any particular element in the desired form. For instance, as above stated, bromine, which is widely used in the production of anti-knock gasolines, is recovered by chemical treatment, whereas chlorine, sodium and hydrogen may be obtained by electrochemical treatment through the use of the so-called Nelson cell in carrying out the electrolysis of sodium chloride in concentrated aqueous solution. Metallic elements will, of course, also require electrolytic dissociation for their recovery and, therefore, a plant embodying my invention should include such apparatus as may be required by the particular type of operations called for by the recovery of any particular element, elements or compounds.

It is not the object of my invention to specifically deal with individual types of chemical and electrochemical treatments required in single cases, chemical and electrochemical operations being within the domain of the trained chemist and being per se known. As stated in the premises, the invention has for its main object to provide a general type of sea water processing plant, which will make it possible to recover substances contained in sea water which are now commercially unrecoverable.

A processing plant embodying my invention includes three main subdivisions, to wit: (1) a suitable apparatus for transforming the sea wave energy into power in a utilizable form and for delivering water to the processing apparatus; (2) a processing apparatus including such elements as may be required by the types of operations which may be carried out in connection with the recovery of any particular substance, or substances; and (3) an electric power generating plant adapted to utilize the head of the water leaving the processing apparatus for the generation and delivery of electric power to the sections of the apparatus requiring it in the form of electric current or heat, or both.

Referring to Figs. 1 and 2, A designates in a general way a wave motor and pumping plant, which may be used in carrying my invention into practice in connection with my invention, B designates the processing apparatus and C the electric power generating plant.

In said figures 10 designates floats which are movable up and down along guiding members forming part of the framework 11, on which is mounted a power take-off shaft 12, driving a pump 13 by means of sprocket wheel 14 and chain 15. The pump has a suction pipe 16 submerged into the wave 17 and a delivery pipe 18 leading to a distributor 19 which discharges the water into reservoirs 20, 21, in a manner which will be hereinafter explained.

From the last unit of the processing apparatus, which, as shown is located at a level considerably higher than the level of the sea, water is discharged through a conduit 23 leading to a turbine 24 at a lower level, said water being finally discharged by the turbine through a discharge conduit 25. The turbine is shown as forming part of a turbo-generator set, comprising a generator 26 generating the electric current required for the operation of the plant.

The electric current thus generated may preferably be at a relatively high voltage suitable for the operation of electric motors and lights so that from the main lines 27, 28 it may be delivered to normal voltage lines 29, 30 and to charging lines 31, 32 for the storage battery installation used to store the power thus generated and to transform it into current at a voltage suitable for electrolytic operations.

It may here be observed that where conditions permit for the operation of the turbo-generator set 24—26 to be maintained at a substantially constant rate, it is possible to use a transformer set for delivering low voltage current to the tanks instead of the storage battery installation 33. In a majority of cases, however, due to the irregular manner in which wave power is generated, the use of a storage battery installation alone or as an auxiliary to or substitute for the transformer set during periods of calm will be indicated.

A motor generator set which can be used to transform the current to a lower voltage suitable for running the electrolytic units in place of the storage batteries is shown at 34, 35, where 34 is the motor and 35 is the low voltage generator.

Framework 11 comprises a number of upwardly directed laterally spaced guide members 36, 37, 38, etc., supported by brace members such as shown at 39, and a number of spacing tie-rods 40, 41, at the upper end, and 42, 43 at the lower end connecting and maintaining adjoining guide members at the proper distance from one another.

Between each set of adjoining guide members is slidably mounted a float, such as shown at 44, which is held in sliding relation to the guide members by shoes 45, 46, one at each side thereof. Said shoes are connected by a spacing bar 47, carrying the float, said float being preferably mounted upon said bar so as to be capable of rotation with respect thereto. The floats 44 are thus capable of upward displacement when urged by the onrushing water of succeeding waves and are free to once more descend by virtue of their own weight after each wave has passed beyond them or when the water is retreating. The guide members are preferably inclined toward the shore so that the floats will be urged upwardly not only by virtue of their buoyancy, but also by the impact of the waves traveling towards the shore or breaking against said floats.

The floats are thus subjected to up and down movements which can be transformed into a continuous rotatory movement of the shaft 12, mounted at the top of the framework in any suitable manner, said shaft being preferably equipped with a flywheel 49 and a power take-off pulley or sprocket wheel 14.

In the drawings I illustrate, by way of example, one of the possible ways of transmitting movement to shaft 12. In order to carry out the proposed arrangement each float is preferably composed of two hollow spherical or cylindrical bodies 51, 52, loosely mounted on spacing bar 47 and separated from each other by a gap 53 and from the adjoining shoe by a gap 54, 55. Said gaps are provided for the purpose of mounting therein anchoring members 56, 57, 58, fixed upon spacing bar 47 and providing points of attachment for the ends of chains 59, 60, 61, respectively.

A shaft 62 is mounted between adjoining guide members in proximity of the lower end thereof and on said shaft are rotatably mounted idle pulleys or sprockets 63, 64, 65, upon which chains 59, 60, 61 are made to ride.

From said idle pulleys or sprockets the chains are caused to run upwardly to corresponding pulleys or sprockets 66, 67, 68, loosely mounted on shaft 12 and downwardly again to the corresponding anchoring member 53, 54, 55.

The central chain 59 has its attaching ends at the rear while the two side chains 60, 61, have their attaching ends at the front, as can be seen in Figs. 6 and 5, respectively. As a result of this arrangement it will be seen that when the float is forced upwardly by a wave the rear strand 59' of chain 59 will be moved upwardly by the float, causing the corresponding pulley or sprocket 66 to rotate in a clockwise direction, whereas cha'ns 60, 61 will be moved in the opposite direction causing their respective pulleys or sprockets 67, 68 to rotate in a counterclockwise direction. Each pulley 66, 67, 68 is connected by a unidirectionally operative clutch to the adjoining wheel 69, 70, 71, fixed upon shaft 12, all said clutches being operative in the same direction. The clutch arrangements are shown in the drawings as comprising a pawl 72, carried by each pulley or sprocket wheel 66, 67, 68 and a ratchet 73 integral with each driven wheel 69, 70, 71.

It will be seen that by virtue of this arrangement, assuming that all the clutches are operative in a clockwise direction as indicated by the arrow, when a float is forced upwardly by its buoyancy and the impact of a wave, wheel 66 rotating in a clockwise direction will cause the rotation of shaft 12 in the same direction, while wheels 67, 68 will rotate loosely upon said shaft in the opposite direction. During the subsequent movement of descent of the float wheel 66 will be rotated in the opposite direction and will, therefore, rotate loosely on shaft 12 while wheel 67, 68 will now rotate in a clockwise direction and transmit movement to shaft 12 in the same direction. The alternate movement of the floats wi'l thus be transmitted to shaft 12 in the form of an intermittent rotation in a single direction, the extent of each unitary movement of rotation of shaft 12 being dependent upon the extent of the movement imparted by each wave to the floats.

It will be understood that the floats will be designed so as to have a suitable degree of buoyancy so that they will readily respond to the impulses of the onrushing waves and will at the same time be heavy enough to generate the force necessary to operate shaft 12 during their return movement.

As previously stated, shaft 12 is caused to operate a pump 13 which may be of any suitable type capable of sucking water from the underlying sea and delivering said water to the processing apparatus at a higher level.

It is thus seen that the energy necessary to deliver water from the sea to the distributor 19 above is generated by the waves themselves, substantially in a continuous manner. From said distributor water is caused to be discharged into reservoirs 20, 21, serving the processing apparatus which is shown by way of example in a conventional form in Fig. 2.

Referring to said figure, it will be seen that from the distributor 19 water can be directed to either reservoir 20 or reservoir 21 by the operation of a valve 74, pivotally mounted at 75, said valve being shown in a position where it closes conduit 76 leading to reservoir 21 and leaves unobstructed conduit 77 leading to reservoir 20.

A similar distributor valve 78, pivoted at 79, and operatively connected to valve 74 by a connection 80 is used to control the discharge from reservoirs 20, 21. The arrangement presupposes a mode of operation whereby while one reservoir is being emptied the other is being filled so that reservoir 21 being full has its discharge outlet 81 open while discharge outlet 82 of reservoir 20 is closed by valve 78.

The distributor 83 within which valve 78 is mounted has a discharge conduit 84 leading to an evaporating tank 85, said conduit 84 being controlled by a valve 86.

Another conduit 87, controlled by a valve 88, branches out from conduit 84 and leads to electrolytic tanks 89—90, which are connected in series to similar electrolytic tanks 91—92, 93—94, 95—96, said electrolytic tanks resulting in the possibility of subjecting the water to successive electrolytic treatments at progressively increasing voltages so as to effect a fractional electrolytic recovery of various elements contained in the water, the water treated in the first set of tanks being discharged into the second set and so on.

From the last set of tanks 95—96 the water may be discharged through conduit 97 and then through discharge conduit 23 to the turbine 24 below, as previously stated, said conduit 23 being controlled by a valve 98.

Conduit 97 also leads to a tank 99, where the water can be subjected to some chemical treatment, and from there to units 100—101 or units 102—103 through discharge conduits 104, 105, respectvely, said discharge conduits being controlled by valves 106, 107.

Conduit 105 is shown as branching out from conduit 108, leading from tank 99 to condu't 23, said conduit 108 being controlled by a valve 109. The discharge of conduit 97 into tank 99 is controlled by another valve 110. It is therefore, seen that by operating the various valves water discharged from the last set of tanks 95—96 may be caused to reach conduit 23 directly or by first passing through tank 99, in case said water should have to be subjected to some chemical treatment or treatments after the electrolytic treatments.

The evaporating tank 85 is provided for the purpose of producing a preliminary concentration of the water such as is reduced, for instance, for an electrolysis of a solution of sodium chloride represented by the sea water for the recovery of sodium hydroxide and chlorine. In practice this type of operation is carried out by means of the so-called Nelson cell, a number of which is shown d'agrammatically at 111, 112, 113, 114, 115, 116, the brine flowing from the evaporating tank to said cells through discharge conduit 117, controlled by a valve 118 and manifold 119 served thereby. The solution of sodium hydroxide is made to flow from the various cells into a collecting tank 120 through discharge conduits 121, 122, 123.

As stated, the processing plant described is only shown by way of example, since obviously its composition and arrangement will vary according to the nature of the operations for which the plant is intended. The various sets of electrolytic tanks are shown served by the low voltage lines 126, 127, the voltage of the current supplied to each set of tanks being controllable by means of variable resistances, such as shown at 128, 129, 130, 131, 132.

As stated, the low voltage current is supplied to the tanks by a low voltage generator 35 or by a storage battery plant which, for the purpose of illustration, is shown as consisting of two sets each comprising three groups of batteries 133—134—135 and 136—137—138, the batteries composing each group being adapted to supply a suitable low voltage current to lines 126—127 during their period of discharge, and the groups composing each set being adapted to be connected in series during the periods of charge by the higher voltage current supplied by generator 26 to lines 27, 28.

In Fig. 3 I show a diagrammatic wiring arrangement suitable for the production of the required low voltage current. In said diagram it is seen that the low voltage lines 126, 127 may be selectively connected to the supply lines 139, 140 of generator 35, or from the discharge lines 141, 142 of the storage batteries by a double throw switch 143, which is shown in the position where it connects lines 126, 127 to storage battery discharge lines 141, 142. A switch 144 is shown for connecting to or disconnecting motor 34 from the main lines 27, 28, said switch being shown in the open position.

The storage batteries are divided into two sets so that while one set of batteries is being charged the other one is being discharged.

In the drawings a double throw switch 145 is shown connecting charging lines 31, 32 to secondary charging lines 31', 32', which are connected to the extreme ends of the set of batteries composed of groups 133—134—135. Said groups 133—134—135 are connected in series by switches 146, 147, to which their adjoining ends are respectively connected by wires 148—149, 150—151.

Said groups can also be connected in parallel to the discharge lines 141, 142 by wires 133'—133", 134'—134", 135'—135", leading to switches 152, 153, 154, 155, 156, 157, which are shown in the open position and, therefore, inactive.

Similarly, the set of batteries composed of groups 136, 137, 138 can be connected to charging lines 31, 32 by throwing switch 145 to its other position, connecting secondary charging lines 31", 32", groups 136, 137, 138 being adapted to be connected in series through switches 158, 159, which are shown open.

Said groups 136, 137, 138 are shown connected in parallel to discharge lines 141, 142 by switches 160, 161, 162, 163, 164, 165, which are shown in their closed position, so that as a result of the arrangement described the set of batteries 133, 134, 135 is being charged while the set of batteries 136, 137, 138 is being discharged.

The various switches 146, 147 and 152 to 165 can be operated simultaneously as double throw switches, their switch blades being coaxially mounted as shown at 166 and being connected by a single bar 167, said switch blades being, of course, insulated from one another and the bar itself being preferably of insulated or insulating material.

It is thus seen that by virtue of the arrangement described when bar 167 is operated to throw the switches to their opposite position all the connections will be changed, the set of batteries 136, 137, 138 now being connected in series and the set of batteries 133, 134, 135 being connected in parallel to the discharge lines, switch bar 167 being, of course, operated after switch 145 has been thrown into neutral. After the switch connections of the batteries have thus been changed, double throw switch 145 is set to the position where it connects charging lines 31, 32 to secondary charging lines 31", 32", and the connections will thus be completed.

Similarly, when the current is to be supplied to the low voltage lines by the low voltage generator, switch 145 is first thrown into neutral, then switch 143 is thrown into connection with supply lines 139, 140 and switch 144 is closed so as to connect motor 34 with the main lines.

It is, of course, possible to suitably modify the wiring connections so as to jointly connect the batteries and motor 34 to the main lines and to singly or jointly connect the batteries and the low voltage generator to the low voltage lines, if desired, the arrangement described being given only by way of example.

It is also, of course, possible to arrange the supply of water to the turbine 24 so that it flows directly from one of the reservoirs as shown, for instance, at 168 in Fig. 2, and it is also possible to provide a collecting tank in place of or besides tank 99 of dimensions large enough to make it suitable as a reservoir supplying the water required for the operation of said turbine.

Some of the chemical or electrochemical operations to be carried out in the plant may require the application of heat; for instance, heat may be used to raise the temperature of the electrolyte in the case of electrolytic operations in order to raise its conductivity and it is within the scope of my invention to utilize the electric current available also for this purpose whenever desirable or necessary.

These and other changes may, of course, be introduced in the plant shown by way of example without departing from the inventive idea.

The drawings should, therefore, be understood as being intended for illustrative purposes only and not in a limiting sense.

I, accordingly, reserve the right to carry my invention into practice in all those ways and manners which may enter, fairly, into the scope of the appended claims.

I claim:

1. The method of recovering from sea water a substance dissolved therein, which consists in utilizing the energy of the waves to deliver said water at a higher level, utilizing the head of water thus delivered to generate electrical energy, processing said water, and employing the electrical energy thus generated in carrying out the processing operations.

2. Apparatus for recovering from sea water a substance dissolved therein, comprising a wave motor, a pump operated thereby, sucking water from the sea and discharging it at a higher level, a processing plant including a reservoir for receiving the water discharged by the pump, a turbine utilizing the head of water discharged from the processing plant, an electric generator driven by said turbine, and means for utilizing the electrical energy generated thereby in connection with the operation of the processing plant.

3. Apparatus for recovering from sea water a substance dissolved therein, comprising a wave motor, a pump operated thereby, sucking water from the sea and discharging it at a higher level, a processing plant including a reservoir for receiving the water discharged by the pump, a turbine utilizing the head of water discharged from the processing plant, an electric generator driven by said turbine, storage batteries activated by the electric current generated by said generator, and means for utilizing the discharge current of said batteries in connection with the operation of the processing plant.

4. Apparatus for recovering from sea water a substance dissolved therein, comprising a wave motor, a pump operated thereby, sucking water from the sea and discharging it at a higher level, a processing plant including a reservoir for receiving the water discharged by the pump, a turbine utilizing the head of water discharged from the processing plant, an electric generator driven by said turbine, a motor actuated by the electric current generated by said generator, a low voltage generator driven by said motor, and means for utilizing the current generated by said low voltage generator in connection with the operation of the processing plant.

5. Apparatus for recovering from sea water a substance dissolved therein, comprising a wave motor, a pump operated thereby, sucking water from the sea and discharging it at a higher level, a processing plant including a reservoir for receiving the water discharged by the pump, a turbine utilizing the head of water discharged from the processing plant, an electric generator driven by said turbine, storage batteries activated by the electric current generated by said generator, a motor also actuated by said current, a low voltage generator driven by said motor, and means for selectively utilizing the discharge current of said batteries, or the current generated by said low voltage generator, in connection with the operation of the processing plant.

6. Apparatus for recovering from sea water substances dissolved therein, comprising a wave motor, a pump operated thereby, sucking water from the sea and delivering it at a higher level, a processing plant including a reservoir for receiving the water discharged by the pump, and a plurality of units for the successive treatment of said water and fractional recovery of said substances, a turbine utilizing the head of water discharged from the processing plant, an electric generator driven by said turbine, and means for utilizing the electrical energy generated thereby in connection with the operation of the processing plant.

7. Apparatus for recovering from sea water a substance dissolved therein, comprising a wave motor, a pump operated thereby, sucking water from the sea and discharging it at a higher level, a processing plant including two reservoirs for receiving the water discharged by the pump, and a plurality of units for the treatment of said water and recovery of said substance, means for selectively directing the water discharged by said pump to either reservoir, means for selectively connecting either reservoir to said units, a turbine utilizing the head of water discharged from the processing plant, an electric generator driven by said turbine, and means for utilizing the electrical energy generated thereby in connection with the operation of the processing plant.

8. Apparatus for recovering from sea water a substance dissolved therein, comprising a wave motor, a pump operated thereby, sucking water from the sea and discharging it at a higher level, a processing plant including a reservoir for receiving the water discharged by the pump, a plurality of units for the treatment of said water and recovery of said substance, an evaporating tank, means for selectively directing water from said reservoir to said units and evaporating tank, a turbine utilizing the head of water discharged from the processing plant, an electric generator driven by said turbine, and means for utilizing the electrical energy generated thereby in connection with the operation of the processing plant.

9. In apparatus of the character described, comprising a processing plant, a wave motor comprising a float, a framework on which said float is mounted so as to be capable of upward and downward movement, a shaft rotatably mounted on said framework, power transmitting means interposed between said float and said shaft, transforming the up and down movements of said float produced by sea waves into a rotatory movement of said shaft in a single direction, a pump sucking water from the sea and delivering it to the processing plant, actuated by said shaft, a turbine utilizing the head of water discharged from the processing plant, an electric generator driven by said turbine, and means for utilizing the electrical energy generated thereby in connection with the operation of the processing plant.

ARTHUR E. ZOPPA.